2 Sheets--Sheet 1.

C. LIDREN.
Harvester.

No. 168,653.

Patented Oct. 11, 1875.

WITNESSES:
E. Wolff
N. T. Terry

INVENTOR:
C. Lidren
BY
ATTORNEYS.

C. LIDREN.
Harvester.
No. 168,653
Patented Oct. 11, 1875.
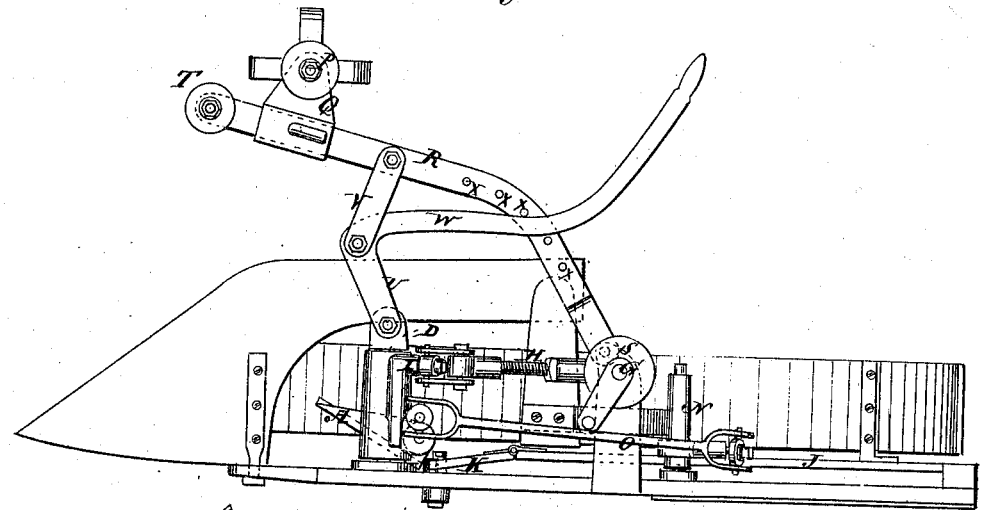
Fig. 3
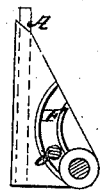
Fig. 5
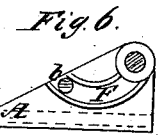
Fig. 6
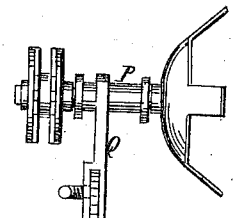
Fig. 4
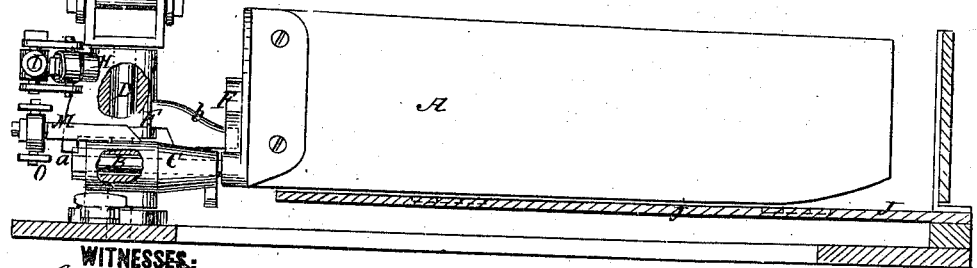
WITNESSES:
A. F. Terry
E. Wolff
INVENTOR:
C. Lidren
BY
ATTORNEYS.

UNITED STATES PATENT OFFICE.

CHRISTOPHER LIDREN, OF LA FAYETTE, INDIANA, ASSIGNOR TO HIMSELF AND R. JACKSON, OF SAME PLACE.

IMPROVEMENT IN HARVESTERS.

Specification forming part of Letters Patent No. 168,653, dated October 11, 1875; application filed June 5, 1875.

*To all whom it may concern:*

Be it known that I, CHRISTOPHER LIDREN, of La Fayette, in the county of Tippecanoe and State of Indiana, have invented a new and Improved Harvester, of which the following is a specification:

My invention consists of the combination, with a scraper or rake pivoted to the rake-standard to swing backward and forward to discharge the gavels, of a double cam on the rake-standard, in connection with the crank-shaft contrived to swing the rake forward and backward, and to turn the rake or scraper up edgewise preparatory to going back to scrape off the gavel, and turn it down flatwise preparatory to going forward again. It also consists of the platform contrived with a jointed section in the forward part, and a passage for the scraper from the rear part thereto, in combination with the scraper, operating as above described, to pass the scraper forward below the platform and up through it and the grain which falls while a gavel is being discharged, for a means of returning the rake to the front without interfering with the grain lying on the platform; and the invention also consists of a novel contrivance of supporting and adjusting levers for the reel, whereby it can be readily raised and lowered by the driver without moving from his seat, and without altering the tension of the belt.

Figure 1:
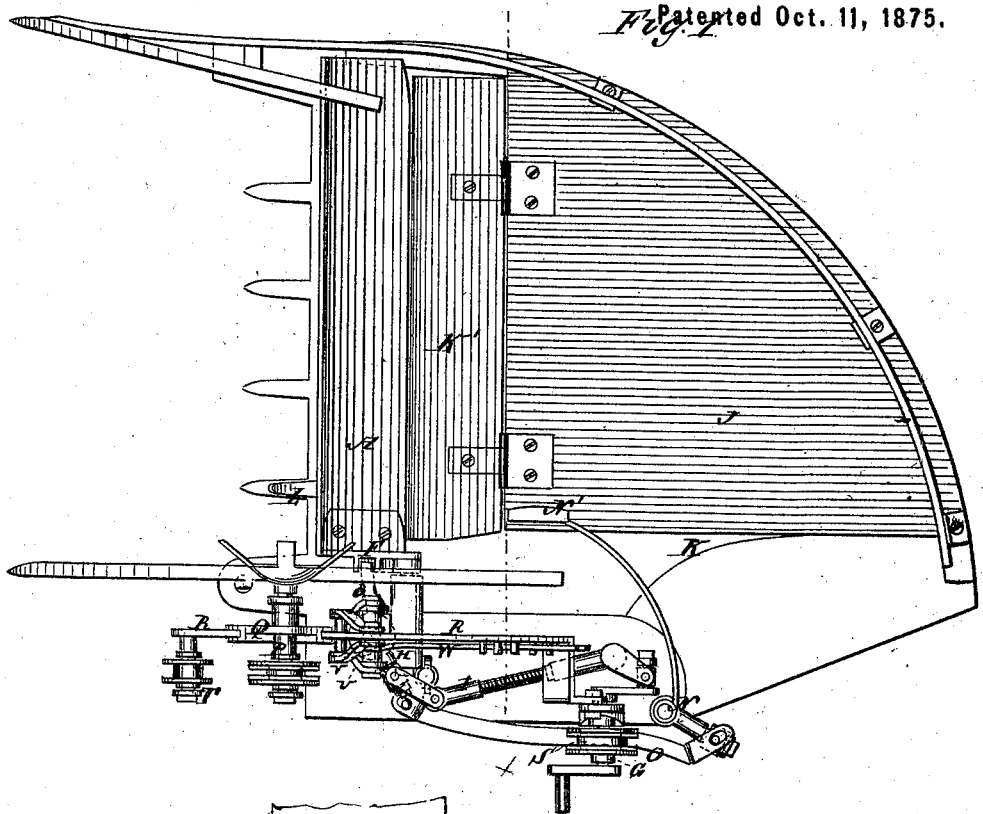
Figure 2:
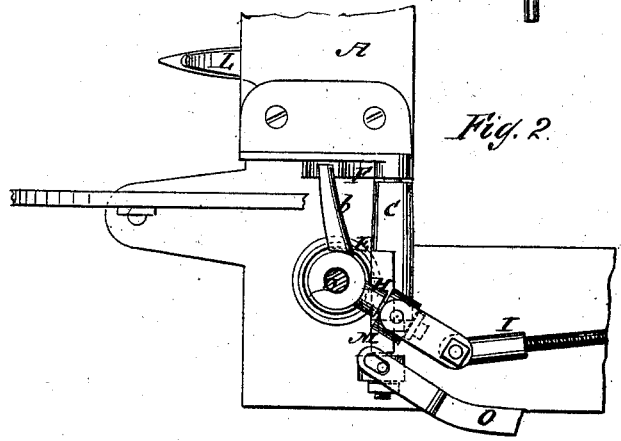

Figure 1 is a plan view of my improved harvester. Fig. 2 is a top view of some of the parts and horizontal section of the rake-standard. Fig. 3 is a side elevation. Fig. 4 is a transverse section on the line $x\,x$ of Fig. 1, and Figs. 5 and 6 are details of the rake or scraper.

Similar letters of reference indicate corresponding parts.

A is the rake or scraper, which is connected by its pivot B to the support C, which is mounted on the lower part of the rake-standard D, to swing the rake backward and forward. E is a sleeve, also mounted on the rake-standard for swinging the rake, and also for turning it on its own axis up and down. The arm $a$ of this sleeve bears against the support C, and engages a cam on the end of rake for swinging the rake forward. The arm $b$ swings the rake back by bearing against support C on the opposite side, and said part $b$ extends into the cam-slot F on the rake for turning it up and down. This armed sleeve swings a little free of the bearing C, and it is connected to the crank-shaft G by the short arm H and connecting-rod I, the rod being extensible to adjust the sleeve E rightly to the bearing C. By the turning of the sleeve E a little free of the bearing C the part $b$ is made to swing a little in the slot F, so that when it swings to the right it turns the rake up edgewise or vertically, as indicated in Fig. 4, to scrape off the gavel, and when it swings the other way it turns the rake down, as in Fig. 6, to swing it back under the overhanging or suspended platform J, below which it drops at K after having discharged the gavel, and under which it is carried by part $a$ of the sleeve, which comes in contact with and sets the support C in motion at the moment the part $b$ has thrown the upper edge down, as in Fig. 6. At the front part of the platform is the jointed section K', which is raised by the rake coming to the upper side again, and falls back as soon as the rake has passed it, closing the opening, so as to prevent any grain from falling through. At the same time that the rake comes up through the platform its front edge runs up the stationary cam L to be turned upright far enough for the part $b$ of sleeve E to enter the grooves F, from which it escapes after turning the rake down at the beginning of the forward movement. The support C also has an arm, M, to communicate motion to the shaft N of the butt guard or regulator N' of the gavel by the connecting-rod O. The support P for the reel-shaft is mounted on the standard Q, which slides freely along the lever R, on which it is mounted to shift the reel forward and backward, as required by the different conditions of the grain; and the lever is pivoted at the end of its long arm to the standard of the shaft carrying the pulley S, which drives the reel, and is supported in a vertically-adjustable fulcrum for regulating the height of the reel, so that as the lever swings at or near the axis of wheel S, and the belt runs over idle-pulley T, its tension is not affected essentially either by shifting the reel along the lever or up and down. The adjusting-fulcrum consists of the jointed standards U V and the adjusting-lever W, the latter being an elbow-lever permanently attached to the upper end of standard U, and said standard being pivoted to the top of the rake-standard, while standards V are pivoted to the top of standard U and to the lever, so that by swinging lever W up and down the height of the lever R will be varied. The lever W extends along the machine rearward near to the driver's seat, so that he can work it while sitting to raise or lower the reel. The stud-pins X on the lever Q hold lever W wherever it is placed.

Having thus described my invention, I claim as new and desire to secure by Letters Patent—

1. The combination of arm $a$, pivoted rake A B, and support C, as and for the purpose described.

2. The combination of arm $b$ on the sleeve E with the cam-groove F on the rake, arranged to turn on its axis at the same time that it swings forward and backward, and the sleeve E swings free or independent of the rake to some extent, substantially as specified.

3. The suspended or overhanging platform having a flexible front portion, in combination with a rake arranged to pass over it going back, and under it going forward, substantially as specified.

4. The combination of stationary cam L with the oscillating and swinging rake A, projection $b$, and the cam-groove F, substantially as specified.

5. The combination, with lever R, carrying adjustable reel and pulley T, of the pulley S, as and for the purpose specified.

CHRISTOPHER LIDREN.

Witnesses:
JOHN S. ALLEN,
WESLY S. QUEBE.